United States Patent [19]

Reimann

[11] 4,227,998

[45] Oct. 14, 1980

[54] WASTE DISPOSAL TREATMENT OF CALCIUM-CONTAINING ORGANICALLY LOADED WASTEWATERS

[75] Inventor: Hans Reimann, Munich, Fed. Rep. of Germany

[73] Assignee: Linde Aktiengesellschaft, Wiesbaden, Fed. Rep. of Germany

[21] Appl. No.: 933,838

[22] Filed: Aug. 15, 1978

[30] Foreign Application Priority Data

Aug. 25, 1977 [DE] Fed. Rep. of Germany ........ 2738309

[51] Int. Cl.$^2$ .............................................. C02C 1/06
[52] U.S. Cl. ................... 210/609; 210/627; 210/631
[58] Field of Search ............... 210/6, 7, 10, 15, 18, 210/42 R, 51, 52, 53; 127/46 R

[56] References Cited

U.S. PATENT DOCUMENTS

| | | | |
|---|---|---|---|
| 2,196,840 | 4/1940 | Singleton | 210/18 |
| 3,345,288 | 10/1967 | Sontheimer | 210/10 |
| 3,356,609 | 12/1967 | Bruemmer | 210/18 |
| 3,440,166 | 4/1969 | Davis | 210/10 |
| 3,546,111 | 12/1970 | Bush | 210/18 |
| 3,640,820 | 2/1972 | Kemmer | 210/10 |
| 3,947,350 | 3/1976 | Cardinal | 210/18 |
| 4,071,443 | 1/1978 | Gorski | 210/15 |

OTHER PUBLICATIONS

"Sugar" 28th year, vol. 10, pp. 527–534, 1975.

*Primary Examiner*—Ernest G. Therkorn
*Attorney, Agent, or Firm*—Millen & White

[57] ABSTRACT

For the treatment of wastewaters containing substantial BOD and substantial calcium ion concentrations, e.g., effluents from the washing and flushing cycles of sugar manufacturing plants, by an activated sludge process, under aeration with an $O_2$-containing gas, the improvement which comprises introducing a $CO_2$-containing gas having a concentration of $CO_2$ higher than that of air into liquid present in the activated sludge system to precipitate calcium ion as calcium carbonate thereby lowering the pH of the liquid and facilitating the separation of the activated sludge solids and the bacterial action of the activated sludge process.

9 Claims, No Drawings

WASTE DISPOSAL TREATMENT OF CALCIUM-CONTAINING ORGANICALLY LOADED WASTEWATERS

BACKGROUND OF THE INVENTION

This invention relates to a waste disposal treatment of calcium-containing, organically loaded wastewater by means of an activated sludge process under aeration with almost pure oxygen and/or with an oxygen-containing gas.

Calcium-containing, organically loaded wastewaters are obtained from various processes and in particular, from sugar manufacturing operations. Recently, the sugar industry has adopted activated sludge methods for the purification of such wastewaters, either instead of or in conjunction with the utilization of settling ponds and oxidation ponds. Thus, a wastewater purification process is known, for example, wherein the waste waters produced in the sugar manufacturing plant are circulated via a settling tank; the sludge-transporting water coming from the settling tank is first conducted to a sedimentation tank and an anaerobic tank, and thereafter, to a fermentor with a secondary treatment tank connected downstream thereof. Sludge which has settled in the secondary treatment tank is recycled to the fermentor while purified water withdrawn from the secondary treatment tank can be either returned into the settling tank of the flushing and wash water cycle of the sugar operation, or fed to a drainage ditch. The fermentor can be operated with air or at least with oxygen-enriched air (Reference is made to the periodical "Sugar" 28th year, vol. 10, pp. 527–534, 1975, the contents being incorporated herein).

Unfortunately, the operation of such water treatment plants is not trouble-free. Frequently the activated sludge is uncontrollably degenerated resulting in considerable upset in the degradation efficiency of the secondary treatment. The cause of this phenomenon is primarily due to an unbalanced supply of nutrients, especially when the plants are either underloaded or overloaded. The resulting degenerated sludge, called bulking sludge, can exist, for example, as long threads of bacteria having a low settling velocity. When such a bulking sludge condition occurs, there is a marked slow-down in the separation in the secondary treatment tank into the activated sludge, which is returned into the aeration plant, and into the clear stream discharged into the drainage ditch.

Moreover, a reduction in the bacterial growth in the activated sludge system resulting in a low degradation efficiency can also be caused by the strong alkalinity of the wastewater obtained in the settling tank of the flushing and wash water cycle. Such alkalinity occurs because it is conventional to inject substantial quantities of calcium hydroxide [$Ca(OH)_2$] into the flushing and wash water cycle to avoid bacterial growth, the latter being undesirable in this cycle. Alkalinity is so strong that pH values of up to 12 can occur.

OBJECTS OF THE INVENTION

An object of this invention is to provide an improved process for the purification of calcium-containing wastewaters, especially those emanating from sugar manufacuturing processes.

A particular object is to provide such an improvement that maintains a high degradation efficiency despite occasionally occurring degenerations of the activated sludge and despite the high pH value of the wastewater.

Upon further study of the specification and appended claims, further objects and advantages of this invention will become apparent to those skilled in the art.

SUMMARY OF THE INVENTION

To attain these objects, a $CO_2$-containing gas is either periodically or continually introduced into liquid present in the activated sludge system. Sufficient $CO_2$ is introduced into this step so as to precipitate a part of the calcium dissolved in the wastewater.

The $CO_2$ combines with calcium hydroxide to form calcium carbonate and water. Thus, due to the formation of calcium carbonate, the calcium hydroxide dissolved in the wastewater is converted into a readily removable insoluble precipitate. The greater the quantity of calcium hydroxide converted into calcium carbonate during this process, the lower the resultant pH of the wastewater; the pH is thus adjusted to a range wherein bacterial growth is improved and the degradation efficiency is correspondingly increased.

In this connection, it is advantageous to introduce the $CO_2$-containing gas to such an extent that the pH value in the activated sludge system is maintained between 6 and 8, preferably between 6.5 and 7.5, since bacterial growth in most favorable in case of a wastewater which is only slightly acidic or only slightly alkaline. To adjust to these pH values, it is merely necessary to adjust the rate of the introduction of $CO_2$-containing gas in response to a measured pH value, for example, in the wastewater discharge. There is conventional equipment well known in process control technology for conducting this step.

It has also proven to be advantageous to maintain the introduction of the $CO_2$-containing gas at such a value that the concentration of dry activated sludge matter in the wastewater is maintained at above 8 kg./m$^3$, preferably in the range of 10 to 30 kg./m$^3$, and the proportion of organic substance (defined as the incineration loss) in this dry matter is maintained at 30–70%, preferably 40–60%. The calcium carbonate, precipitated by the introduction of a $CO_2$-containing gas, weights down the activated sludge and leads to an increase in the concentration of dry activated sludge matter, indicating generally the weight proportion of undissolved substances of a solids-water mixture. Thereby, the formation and/or the effects of bulking sludge can be extensively inhibited, and the settling velocity even of thread-like bacteria in the secondary treatment zone can be increased, so that the activated sludge present can be recycled more quickly into the aeration zone and thereby, in the final analysis, a greater quantity of bacteria is available, resulting in an increase in the degradation efficiency of the treatment.

The $CO_2$-containing gas can be injected at various points in the activated sludge process, for example, in the aeration tank or in the sludge return line from the settling tank to the aeration tank.

The concentration of $CO_2$ in the $CO_2$-containing gas can be 100%, but it can also be as low as 5% by volume, the remainder being air or oxygen. It is preferred for the $CO_2$ concentration to be 20 to 50% by volume. Likewise, it is preferred that the $CO_2$ and oxygen-enriched gas (gas having a concentration of $O_2$ higher than that of air) be combined in a single stream. Further in this connection, it is preferred for the $O_2$ enriched gas to contain 50 to 80% by volume of $O_2$. It is evident, in any case, that separate stream of $CO_2$-containing gas and $O_2$-enriched gas can be employed if desired.

At this juncture, it is to be appreciated that the introduction of a $CO_2$-containing gas is advantageous even if the activated sludge process is based on unenriched air for aeration purposes.

This invention is especially applicable to wastewaters having the following composition:

|  | GENERAL | SUGAR MANUFACTURE |
| --- | --- | --- |
| pH | 2–12 | 4–12 |
| $Ca^{++}$ (mg./l) | 100–10 000 | 300–5 000 |
| $BOD$ (mg./l)$^5$ | 400–20 000 | 3000–12 000 |
| COD (mg./l) | 500–30 000 | 4000–17 000 |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Wastewater from the flushing and wash water cycle of a sugar factory was withdrawn from the runoff of a mechanical settling tank and fed into a semiworks, activated sludge plant. The $BOD_5$ of the feed was 12,000 mg/l, the COD was 17,000 mg./l., the pH value was 10–12, and the Ca content was 3,000 mg./l. The aeration tank of the plant had been filled at the beginning with activated sludge from a municipal waste treatment plant, this sludge having a dry matter concentration of 4 kg./m$^3$, an incineration loss of 80%, and a sludge index of 100 ml./g.

A gas was introduced into the aeration tank which contained 60–70% $O_2$ and 30–40% $CO_2$. Thereby, a pH of 6.5–7 was obtained in the tank. The dry matter concentration increased substantially within a short time and attained values of 20–40 kg./m$^3$ with an incineration loss of 40–50% and a sludge index of 20–50 ml./g. At a volume $BOD_5$ load of 5–10 kg./m$^3$·d and a corresponding nominal aeration period of 30–60 hours, $BOD_5$ values of 150–300 mg./l. and COD values of 600–1,200 mg./l. were measured in the effluent from the secondary treatment tank. The Ca content of the effluent was 600 mg./l., i.e., it had decreased by 2,400 mg./l., corresponding to a precipitated quantity of 6,000 mg./l. of $CaCO_3$. (During the determination of the incineration loss, the $CaCO_3$ is converted practically entirely into 3,350 mg./l. of CaO.)

From 12,000 mg./l. of $BOD_5$, approximately 2,500 mg./l. of excess sludge is produced having an organic proportion of about 70%. The following table shows that, in this way, a sludge has been obtained having an organic proportion of about 21% and an incineration loss (previously defined as organic substance) of about 50%. The inorganic proportion causes excellent flocculation and settling properties.

| Component | Sludge Prior to Incineration | Component | Residue After Incineration |
| --- | --- | --- | --- |
| $CaCO_3$ | 6,000 mg./l. | CaO | 3,350 mg./l. |
| Activated sludge organ. | 1,750 mg./l. | Activated sludge organ. | 0 |
| Activated sludge inorgan. | 750 mg./l. | Activated sludge inorgan. | 750 mg./l. |
| Total | 8,500 mg./l. | Total | 4,100 mg./l. |

Organic proportion 1,750/8,500 = 21%
Incineration loss $\frac{8,500 - 4,100}{8,500}$ = 50%

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit or scope thereof, can make various changes and modifications of the invention to adapt it to various usages and conditions.

What is claimed is:

1. In a process for the treatment of calcium ion containing, organically loaded wastewater, wherein the wastewater has a pH of 10–12, contains 300–5,000 mg $Ca^{++}$ per liter, and is from settling tanks containing the wastewater from the flushing and wash water cycle of a sugar manufacturing plant, which comprises subjecting said wastewater to an activated sludge process under aeration with an $O_2$-containing gas in an aeration tank, the improvement which comprises introducing a $CO_2$-containing gas having a concentration of at least 5% by volume of $CO_2$ to lower and maintain the liquid present in the aeration tank at a pH of 6–8 and to precipitate therein said calcium ion as calcium carbonate, the components in the wastewater and the $CO_2$-introduction being such that the concentration of dry activated sludge matter is increased to above 8 kg/m$^3$ and the proportion of organic substance therein, defined as the incineration loss, is maintained at 30–70% by weight, said improvement facilitating the separation of the activated slude solids and the bacterial action of the activated sludge process.

2. A process according to claim 1, wherein the $CO_2$-containing gas and $O_2$-containing gas are combined into a single stream for introduction into the activated sludge process.

3. A process according to claim 2, wherein said single stream is a gas containing 60–70% $O_2$ and 30–40% $CO_2$ by volumne.

4. A process according to claim 1, wherein the pH is maintained at between 6.5 and 7.5.

5. A process according to claim 1, wherein said proportion of organic substance in the dry activated sludge matter is 40–60% by weight.

6. A process according to claim 1, wherein the $O_2$-containing stream contains a concentration of $O_2$ higher than that of air.

7. A process according to claim 1, wherein the $CO_2$-containing gas contains 20–50% by volume $CO_2$.

8. A process according to claim 1, wherein the concentration of dry activated sludge matter is 10 to 30 kg/m$^3$.

9. A process according to claim 1, wherein the wastewater contains 300–5000 mg calcium ion per liter; 3000–12,000 mg BOD per liter, and 4000–17,000 mg COD per liter.

* * * * *